United States Patent [19]

Kishi et al.

[11] 3,805,185

[45] Apr. 16, 1974

[54] SWITCHING OSCILLATOR CONTROLLED BY A MOVING METAL PIECE

[75] Inventors: Yasunori Kishi; Kunio Kobayashi, both of Tokyo; Masami Yamaguchi, Sagamihara; Tsuneo Okamoto, Tokyo, all of Japan

[73] Assignee: Stanley Denki Kabushiki Kaisha, Tokyo, Japan

[22] Filed: June 27, 1973

[21] Appl. No.: 373,969

[30] Foreign Application Priority Data

| | | |
|---|---|---|
| July 5, 1972 | Japan | 47-66713 |
| July 5, 1972 | Japan | 47-66714 |
| July 5, 1972 | Japan | 47-66715 |
| July 5, 1972 | Japan | 47-66716 |

[52] U.S. Cl. .......... 331/65, 331/117 R, 340/258 C, 340/266

[51] Int. Cl. .......... G08c 21/00, H03b 5/12

[58] Field of Search ....... 331/65, 117 R; 340/258 C, 340/266, 282; 307/116; 328/5

[56] References Cited

UNITED STATES PATENTS

| | | | |
|---|---|---|---|
| 3,683,294 | 8/1972 | Gaa | 331/65 |
| 3,747,012 | 7/1973 | Buck | 331/65 |

FOREIGN PATENTS OR APPLICATIONS

| | | | |
|---|---|---|---|
| 1,058,609 | 6/1959 | Germany | 331/65 |

*Primary Examiner*—Herman Karl Saalbach
*Assistant Examiner*—Siegfried H. Grimm

[57] ABSTRACT

A proximity switch using an oscillator with a divided oscillation winding into which a metal control piece is moved to start and stop oscillations for changing the level of current in the circuit. The center tap of the two parts of the winding is connected to a DC source, a first parallel circuit comprising an oscillation transistor, and a bias circuit; and the opposite ends of the coils are connected across the oscillation transistor and DC source so that the degree of inductive coupling between the coils as controlled by the penetration distance of the metal piece between the coils produces abrupt start and cessation of oscillations in the circuit and corresponding changes in circuit current. Temperature induced hysteresis fluctuations are compensated by use of a temperature responsive bias resistor, an oscillation winding core with a temperature-responsive permeability characteristic, or bimetal flux-shunting strips adjacent to the oscillation windings.

6 Claims, 29 Drawing Figures

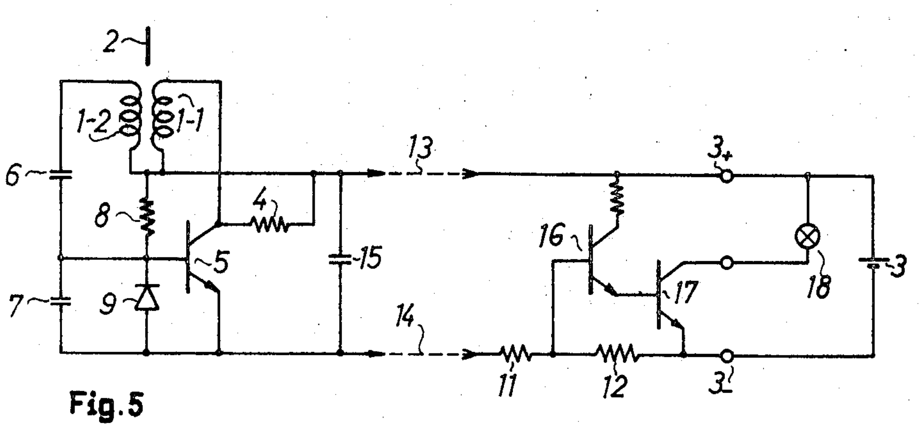
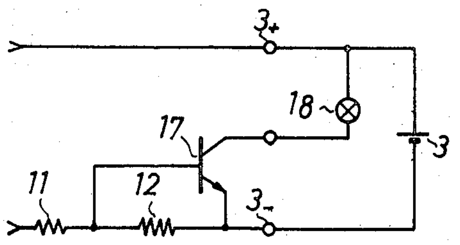
Fig.6
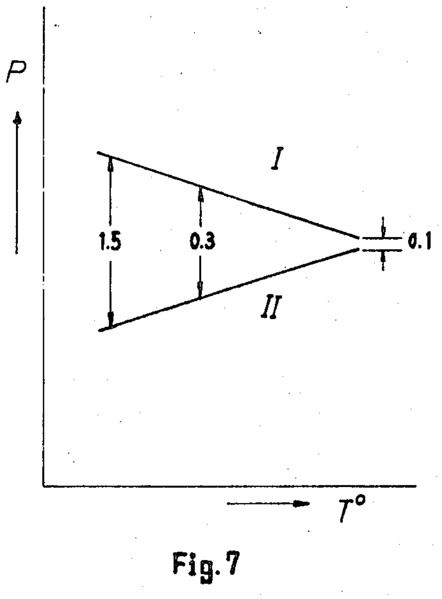
Fig.7
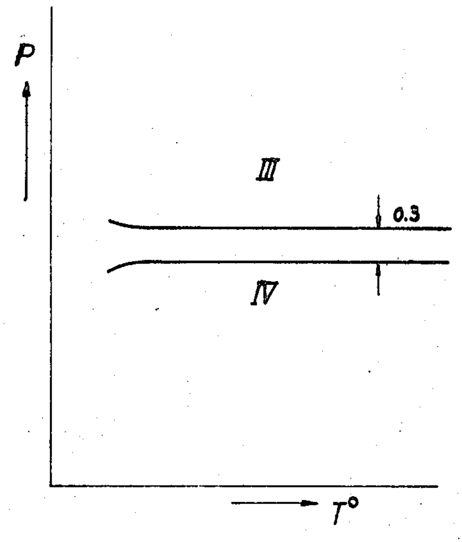
Fig.8

SWITCHING OSCILLATOR CONTROLLED BY A MOVING METAL PIECE

BACKGROUND OF THE INVENTION

1. Field of the Invention

This invention relates to a switching oscillator utilizing a fact that the output of an oscillator associated with an oscillation winding varies in response to the insertion or withdrawal of a metal piece into or from the oscillation winding, and the application of the switching oscillator to a proximity switch.

2. Description of the Prior Art

Hitherto, a proximity switch employing an oscillator has usually been used for the detection of a predetermined number of revolutions of a rotary member or for the detection of the position of a moving member, in addition to speed alarms of various vehicles. In the conventional proximity switch employing the oscillator, however, the output from the oscillator undergoes a substantially linear change in response to the amount of movement of the metal piece combined with an object to be detected. For the construction of the proximity switch, it is therefore necessary to further provide a switching circuit such as a Schmitt trigger circuit, which operates at a constant threshold value. Further, in a case where a detecting device including the oscillator and a detector and a switching unit including the Schmitt trigger circuit, a power source and an indicator are spaced apart from one other, three-wire coupling thereamong is required. Accordingly, the conventional circuit is complicated in construction and expensive, and its circuit characteristics are likely to vary with changes of temperature, voltage and like conditions. Moreover, there is the possibility that the circuit breaks down in the case of half-conduction of the oscillation transistor employed in the oscillator.

SUMMARY OF THE INVENTION

An object of this invention is to provide a switching oscillator capable of switching the output thereof in response to the movement of a metal piece to be detected.

Another object of this invention is to provide a proximity switch using the switching oscillator capable of extending by use of two-wire connection lines.

Another object of this invention is to provide a proximity switch using the switching oscillator substantially compensated against fluctuations of the hysteresis characteristic.

Further object of this invention is to provide a proximity switch using the switching oscillator substantially compensated against fluctuations of the switching characteristic within a certain temperature range.

In accordance with the principle of this invention, a switching oscillator comprises an oscillation winding with a middle tap, a metal piece employed for being inserted into the oscillation winding to change the degree of coupling between first and second parts of the oscillation winding divided thereinto at the middle tap, a first parallel circuit formed by the first part of the oscillation winding and a first resistor, a DC source, an oscillator transistor having its emitter-collector path connected between the first and second terminals of the DC source through the first parallel circuit, the middle tap being connected to the first terminal of the DC source connected to the first parallel circuit, a first capacitor connected between the other end of the second part of the oscillation winding and the base of the transistor, bias means connected between the first terminal of the DC source and the base of the oscillation transistor, and a second parallel circuit formed by a second capacitor and a diode and connected between the base of the oscillation transistor and the second terminal of the DC source. When a predetermined amount of change in the degree of coupling is caused by the movement of the metal piece, switching to an abrupt generation or stop of an alternating current superimposed on the dc current between the terminals of the DC source is performed. The switching oscillator is applied to form a proximity switch.

BRIEF DESCRIPTION OF THE DRAWINGS

The principle, construction and operation of this invention will be clearly understood from the following detailed description taken in conjunction with the accompanying drawings, in which:

FIG. 5 is a circuit diagram illustrating another embodiment of this invention;

FIG. 6 is a circuit diagram illustrating a modification of a part of the embodiment shown in FIG. 5;

FIGS. 7 and 8 are characteristic diagrams explanatory of the characteristics of the embodiments shown in FIGS. 1 and 5;

DESCRIPTION OF THE PREFERRED EMBODIMENTS

Figure 1:
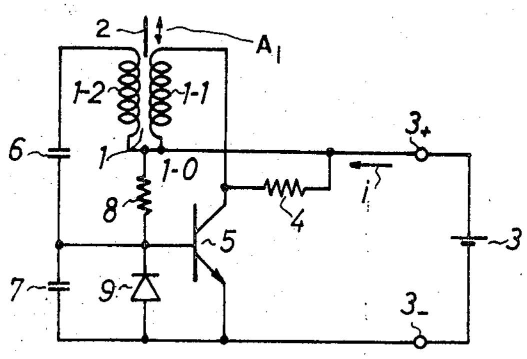
FIG. 1 is a circuit diagram illustrating an embodiment of this invention.

With reference to FIG. 1 showing an embodiment of the switching oscillator of this invention, an oscillation winding 1 is divided at its middle tap 1-0 into first and second coils 1-1 and 1-2. A metal piece 2 moves in the direction of an arrow A, to alter the degree of coupling between the first and second coils 1-1 and 1-2 of the oscillation coil 1. A reference character 3 indicates a DC source, which has terminals $3_+$ and $3_-$. A first parallel circuit formed by the first coil 1-1 of the oscillation winding 1 and a resistor 4 is connected in series with the collector-emitter path of an oscillating NPN-type transistor 5 and connected between the terminals $3_+$ and $3_-$ of the DC source 3. The middle tap 1-0 of the oscillation winding 1 is connected to the terminal $3_+$ of the DC source 3, and a first capacitor 6 is connected between the other end of the second coil 1-2 of the oscillation winding 1 and the base of the oscillating transistor 5. Between the first terminal $3_+$ of the DC source 3 and the base of the oscillating transistor 5 is connected a bias resistor 8. Between the base of the oscillating transistor 5 and the second terminal $3_-$ of the DC source 3 is connected a second parallel circuit formed by a second capacitor 7 and a diode 9.

Figure 2A:
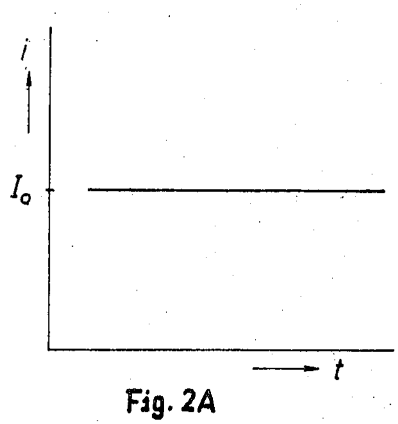
FIGS. 2A and 2B are waveform diagrams explanatory of the operations of the embodiment shown in FIG. 1.

In such an arrangement as described above, when the metal piece 2 is not inserted between the first and second coils 1-1 and 1-2 of the winding 1, an electromotive force produced by a positive feedback current flowing in the second coil 1-2 is cancelled by the action of the magnetic flux due to an oscillation current flowing in the first coil 1-1. In this case, since the feedback current becomes reduced to zero, the oscillation of the oscillator circuit is not initiated and a current $i$ flowing from the DC source 3 has a constant value $I_0$ as shown in FIG. 2A.

Figure 2B:
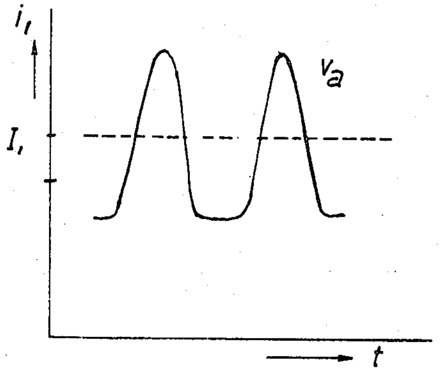
Figure 3:
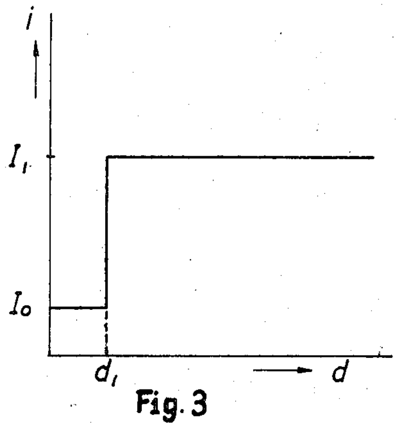
FIGS. 3 and 4 are characteristic diagrams explanatory of the characteristics of the embodiment shown in FIG. 1.
Figure 4:
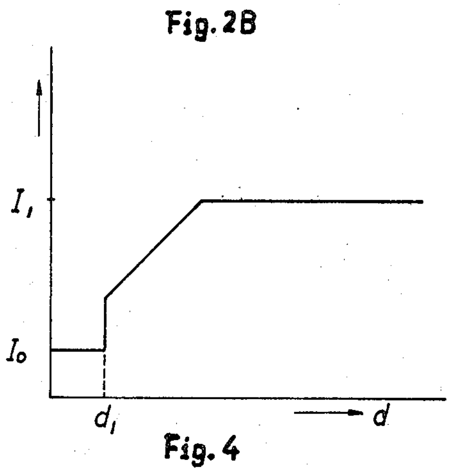

When the metal piece 2 starts to move in between the coils 1-1 and 1-2, the action that the feedback current flowing in the coil 1-2 is cancelled by the magnetic flux emanating from the coil 1-1 is diminished, so that the circuit starts to oscillate at a frequency dependent upon the value of the coil 1-1 and that of the inter-electrode capacitance CcB between the collector and the base of the transistor 5. As a result of this, between the terminals $3_+$ and $3_-$ of the DC source 3, there flows an AC current $V_a$ of such a waveform as shown in FIG. 2B, while being superimposed on the DC current $I_0$. The reason why the lower portion of the AC current $V_a$ is cut out is that the peak value portions of the feedback current fed back to the transistor 5 through the feedback capacitor 6 are clipped by the clipping diode 9 in the negative cycle and that when the voltage on the side of the collector of the coil 1-1 is reduced lower than that of the terminal $3_+$ of the DC source by the oscillation of the circuit, a current flows in the collector of the transistor 5 through the resistor 4 from the DC source 3. The current flowing in the collector of the transistor 5 through the resistor 4 causes an abrupt change in the current flowing in the coil 1-1, so that an abrupt change is also caused in the current flowing in the coil 1-2. Consequently, the current flowing in the base of the transistor 5 through the coil 1-2 and the capacitor 6 is increased, which provides an oscillation in a substantially saturated condition simultaneously with the initiation of the oscillation of the circuit. This mode of operation is clearly shown in FIGS. 3 and 4, in which the relationships of the current $i$ flowing in the circuit to the distance $d$ of insertion of the metal piece 2 into the oscillation coil 1 are illustrated. It appears from these figures that the oscillator of this invention provides the switching characteristic, in which the current $i$ rapidly varies from the value $I_0$ to a value $I_1$ at a distance $d_1$ of insertion of the metal piece 2. The current $I_1$ is an output derived from the oscillator when the AC current $V_a$ in FIG. 2B is smoothed.

In the above example, the NPN-type transistor 5 can be replaced by a PNP-type transistor, in which case the polarity of the DC source 3 is reversed and the conducting direction of the diode 9 is reversed.

It is also possible to normally maintain the oscillation of the circuit by reversing the polarity of coupling of the coils 1-1 and 1-2 and to effect switching in a manner to stop the oscillation by the insertion of the metal piece 2.

FIG. 5 illustrates one example of a proximity switch of this invention, which employs such an oscillator as described above. The terminals $3_+$ and $3_-$ of the DC source 3 are connected through detection resistors 11 and 12 to connection lines 13 and 14 of the oscillator. Between the connection lines 13 and 14 a smoothing capacitor 15 is connected, and a parallel circuit formed by the coil 1-1 and the resistor 4 is connected in series to the collector-emitter path of a transistor 5. Transistors 16 and 17 form a current amplifier, which amplifies currents flowing in the detecting resistors 11 and 12 and supplies them to a load 18, such as a lamp. The other constructions are the same as those in the circuit of FIG. 1.

The current flowing from the terminal $3_+$ of DC source is divided into two: one drives the oscillator and flows in the terminal $3_-$ of the DC source through the resistors 11 and 12, and the other flows in the base-emitter path of the transistor 16 and that of the transistor 17 and then flows to the terminal $3_-$ of the DC source. However, when the oscillator is not in its oscillating state, the current flowing in the transistor 5 is extremely small, so that the current flowing in the resistor 11 is also small. Therefore, a voltage drop across the resistor 12 is small and the sum of a voltage of about 0.6V necessary for flowing the current in the base-emitter path of the transistor 16 and that of about 0.6V necessary for flowing the current in the base-emitter path of the transistor 17, that is, about 1.2V, is not obtained. Accordingly, no current flows in the transistors 16 and 17. However, when the oscillator oscillates, the current increases and the voltage across the resistor 12 exceeds the aforesaid voltage 1.2V, so that the base currents flow in the transistors 16 and 17 to conduct them. In this case, the resistor 11 prevents overflow of the base currents of the transistors 16 and 17 when the voltage drop across the resistor 12 becomes too large.

Where the load 18 is light, a preamplifier employing the transistor 16 may be eliminated as shown in FIG. 6. Further, it is also possible to increase the amplifying stages, if necessary.

Figure 9A:
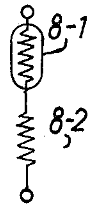
FIGS. 9A, 10A and 11A are circuit diagrams illustrating an improved resistance circuit employed in this invention.
Figure 9B:
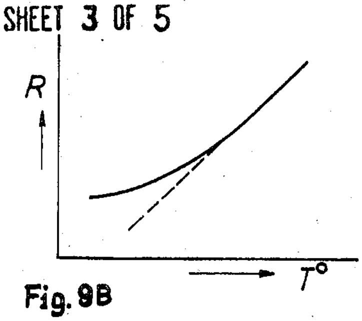
FIGS. 9B, 10B and 11B are characteristic diagrams explanatory of the characteristics of the circuits shown in FIGS. 9A, 10A and 11A, respectively.
Figure 10A:
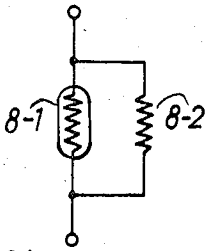
Figure 10B:
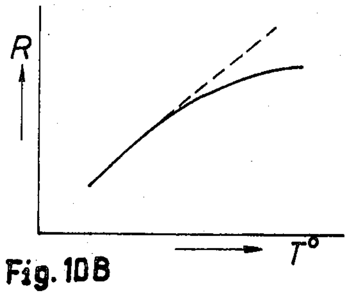
Figure 11A:
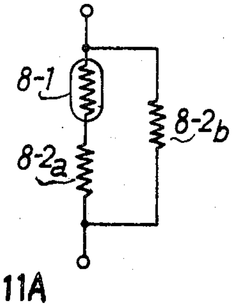
Figure 11B:
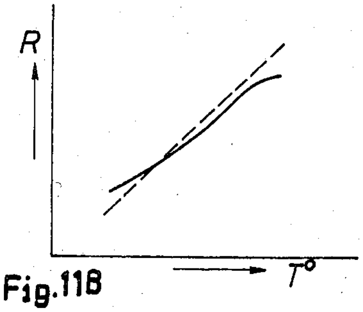

It is desirable that the start and stop of the oscillator caused by movement of the metal piece 2 are performed at the same position. However, a little hysteresis characteristic is not avoidable in the above embodiments as shown in FIG. 7. In FIG. 7, the abscissa is the temperature T°, while the ordinate is the inserted position P of the metal piece 2. A line I designates the start of oscillation, while a line II designates the stop of oscillation. In order to compensate the fluctuation of the hysteresis caused by the change of temperature T°, a resistor circuit such as a thermistor of positive characteristic can be employed as the bias resistor 8 of the transistor 5. As a result of this construction, the resistance of the bias resistor 8 decreases at the lower temperature region so as to increase the bias action, while a reverse action is caused at the high temperature region. Accordingly, a uniform characteristic shown in FIG. 8 can be obtained, in which curves III and IV respectively designate the start position of oscillation and the stop position of oscillation. In FIGS. 7 and 8, numerals 1.5, 0.3 and 0.1 are distances in milli-meter. Actual examples of the resistor circuit are shown in FIGS. 9A, 10A and 11A, in which a resistor 8-1 has a positive temperature coeficient while resistors 8-2, 8-2*a* and 8-2*b* are ordinary resistors. The resistor circuit shown in FIG. 9A is employed to improve the characteristic of resistance R in the higher temperature range as shown in FIG. 9B. The resistor circuit shown in FIG. 10A is employed to improve the lower temperature range as shown in FIG. 10B. A characteristic shown in FIG. 11B substantially equivalent to a desired characteristic shown by a dotted line can be obtained by a combination circuit shown in FIG. 11A.

Figure 12:
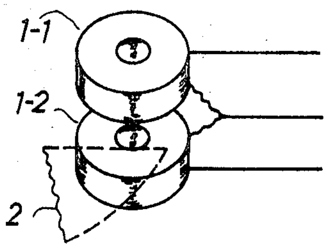
FIGS. 12 and 13 are respectively a perspective view and a longitudinal section illustrating examples of oscillation coils employed in this invention.
Figure 13:
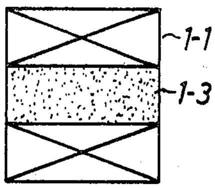
Figure 15:
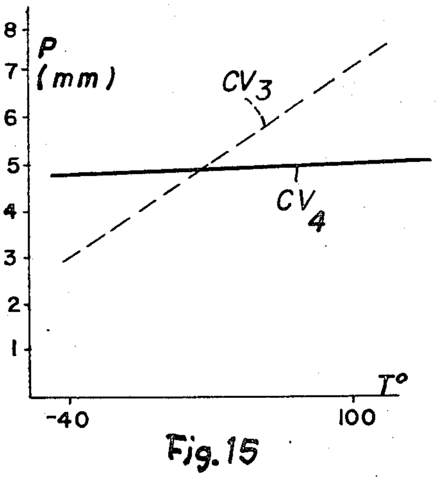
FIG. 15 is a characteristic diagram explanatory of improved characteristics of the proximity switch of this invention using the coil shown in FIG. 13.

If the oscillation winding 1 is formed by two air-core coils 1-1 and 1-2, as shown in FIG. 12, in the oscillator of the proximity switch constructed as described above, it was observed that where temperature was changed within the range of, for example, –40° to 100° C, the position of the metal piece 2 at which the oscillator was started to oscillation varies about 4mm as indicated by a curve $CV_3$ in FIG. 15. This is caused by a change in the amplification factor of the transistor 5 due to the temperature change. For example, at low temperature, the amplification factor of the transistor 5 lowers to cause a decrease in the effective degree of coupling between the coils 1-1 and 1-2 and, as a result of this, the oscillator starts its oscillation at a position where the amount of shielding the coils 1-1 and 1-2 from each other by the metal piece 2 is small.

Figure 14:
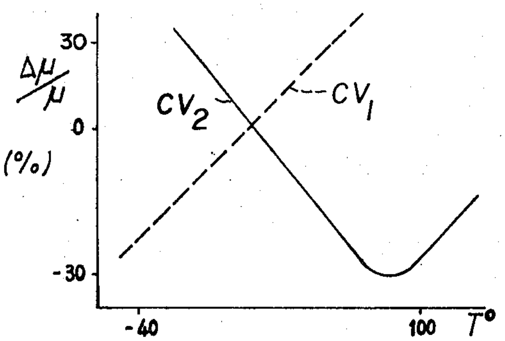
FIG. 14 is a characteristic diagram explanatory of the temperature characteristic of the coils shown in FIGS. 12 and 13.

To compensate for the above variation in the oscillation starting position in the present invention, cores 1-3 are inserted into the coils 1-1 and 1-2 respectively. The curves $CV_1$ and $CV_2$ in FIG. 14 are deviation rate of permeability ($\mu$) of the cores showing positive and negative temperature coefficients. Since the cores 1-0 of negative temperature coefficients are inserted into the coils 1-1 and 1-2, it is possible that the variation in the position of the metal piece 2 for starting the oscillation is maintained only within about 0.4mm in the temperature range of –40° to 100° C, as indicated by the curve $CV_4$ in FIG. 15.

Figure 16A:
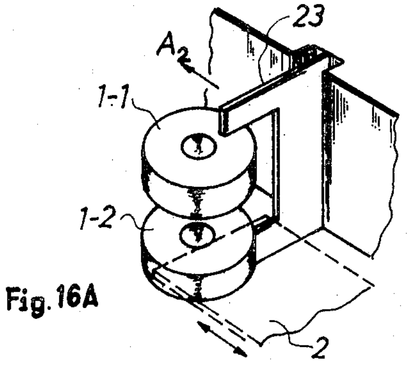
FIGS. 16A and 16B are perspective views illustrating improved examples of the oscillation coils employed in this invention.
Figure 16B:
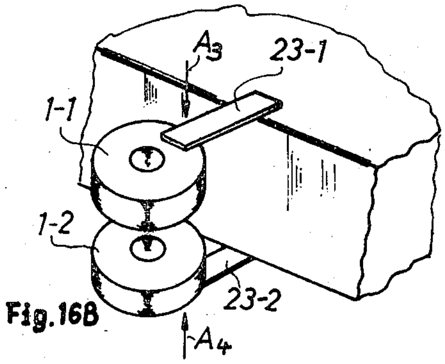
Figure 17:
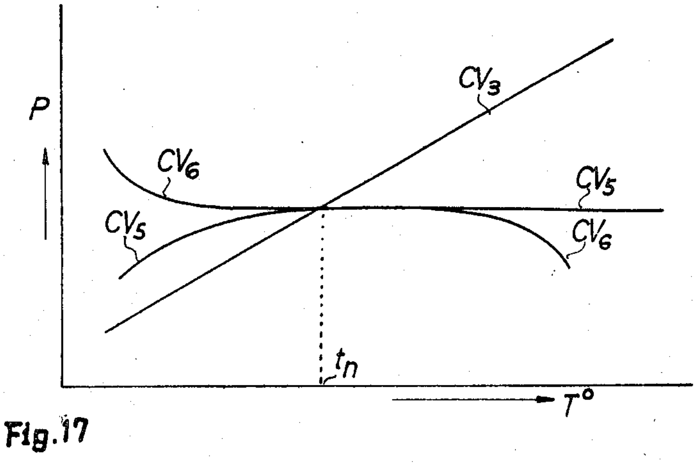
FIG. 17 is a characteristic diagram explanatory of improved characteristics of a proximity switch of this invention using the coils shown in FIGS. 16A and 16B.

The above temperature compensation may also be achieved with other construction. FIGS. 16A and 16B show examples employing bimetals 23, 23-1 and 23-2, in which the coils 1-1 and 1-2 are moved in the directions of the arrows A2, A3 and A4 due to temperature change, thereby to adjust the degree of coupling between the coils in a direction opposite to that of temperature change. The curves $CV_5$ and $CV_6$ in FIG. 17 show temperature compensation characteristics of the examples of FIGS. 16A and 16B respectively. A reference $t_n$ indicates a normal temperature.

Figure 18A:
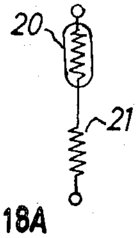
FIGS. 18A, 19A and 20A are circuit diagrams illustrating examples of a resistance circuit employed in this invention to improve the temperature characteristic of the proximity switch of this invention.
Figure 19A:
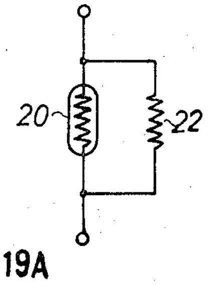
Figure 20A:
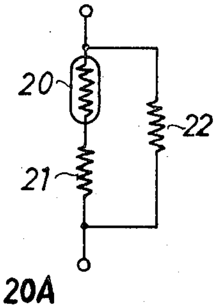

Further, the temperature compensation may also be effected by using, as the bias resistor 8 of the oscillator, a resistance element 20 such as a thermistor having a negative temperature characteristic. FIGS. 18A, 19A and 20A illustrate examples of the circuit of the resistor 8 respectively comprising a thermistor 20 and an ordinary series resistor 21, a thermistor 20 and an ordinary parallel resistor 22, and a thermistor 20 and the resistors 21 and 22.

Figure 18B:
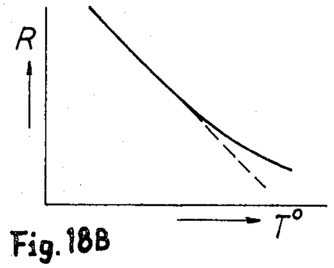
FIGS. 18B, 19B and 20B are characteristic diagrams explanatory of characteristics of the circuits shown in FIGS. 18A, 19A and 20A respectively.
Figure 19B:
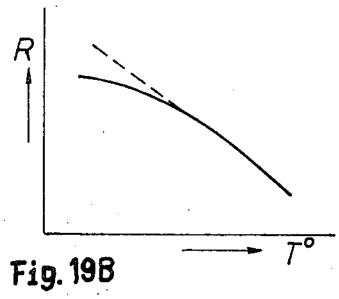
Figure 20B:
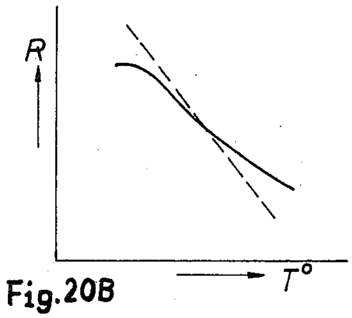
Figure 21:
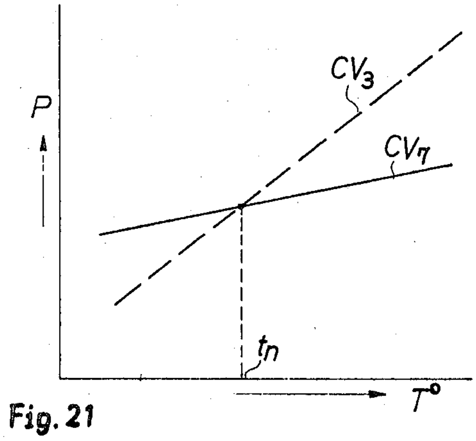
FIG. 21 is a characteristic diagram explanatory of improved characteristics of a proximity switch of this invention using the circuits shown in FIGS. 18A, 19A and 20A.

FIGS. 18B, 19B and 20B show their compensation characteristics respectively. The curve $CV_7$ in FIG. 21 shows the characteristic after compensation in the case of using a thermistor only, from which it appears that the variation in the position of the metal piece 2 can be maintained within about 0.6mm in a temperature range of –30° to 80° C.

As will be understood from the foregoing detailed description, the present invention provides the following advantages:

1. Since the oscillator exhibits a switching characteristic, the entire circuit construction can be simplified by omitting an intermediate amplifier, a Schmitt trigger circuit and so on, which are usually required in the latter stage in the case of constructing a proximity switch.
2. Since the oscillator has the switching characteristic, it is possible to eliminate the possibility of breakdown of the output or intermediate stage resulting from an increase in the collector loss due to half conduction.
3. By the extension of two connection lines, the oscillator, the amplifier, and the display section can be positioned apart from one other.
4. The position of the metal piece for starting the oscillation can be maintained substantially constant irrespective of a temperature change.

What we claim is:

1. A switching oscillator, comprising:

an oscillation winding having a middle tap;

a metal piece employed for being inserted into the oscillation winding to change the degree of coupling between first and second parts of the oscillation winding divided thereinto at the middle tap;

a first parallel circuit formed by the first part of the oscillation winding and a first resistor;

a DC source;

an oscillation transistor having its emitter-collector path connected between the first and second terminals of the DC source through the first parallel circuit, the middle tap being connected to the first terminal of the DC source connected to the first parallel circuit;

a first capacitor connected between the other end of the second part of the oscillation winding and the base of the transistor;

bias means connected between the first terminal of the DC source and the base of the oscillation transistor; and a second parallel circuit formed by a second capacitor and a diode and connected between the base of the oscillation transistor and the second terminal of the DC source;

and in which when a predetermined amount of change in the degree of coupling is caused by the movement of the metal piece, switching to an abrupt generation or stop of an alternating current superimposed on the dc current between the terminals of the DC source is performed.

2. A switching oscillator according to claim 1, further comprising:

a pair of connection lines inserted for connecting the first and second terminals of the DC source to the collector-emitter path of the oscillating transistor through at least one detection resistor and the first parallel circuit;

a smoothing capacitor connected across the connection lines; and amplification means connected to the detection resistor for amplifying a change of a DC current flowing in the detection resistor to apply an amplyfied output to a load.

3. A switching oscillator according to claim 2, in which said bias means comprises at least one resistor having a positive temperature coefficient.

4. A switching oscillator according to claim 2, in which said bias means comprises at least one resistor having a negative temperature coefficient.

5. A switching oscillator according to claim 2, in which said oscillation winding comprises two coils each having a core of a negative temperature coefficient.

6. A switching oscillator according to claim 2, in which said oscillation winding comprises two coils associated with means for controlling the degree of coupling between the coils in the opposite polarity to that caused by a temperature change.

* * * * *